United States Patent
Geng et al.

(10) Patent No.: US 12,052,646 B2
(45) Date of Patent: Jul. 30, 2024

(54) DATA TRANSMISSION METHOD, APPARATUS, AND COMPUTER STORAGE MEDIUM

(71) Applicant: Huawei Technologies Co., Ltd., Shenzhen (CN)

(72) Inventors: Tingting Geng, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 434 days.

(21) Appl. No.: 17/408,192

(22) Filed: Aug. 20, 2021

(65) Prior Publication Data

US 2021/0385725 A1 Dec. 9, 2021

Related U.S. Application Data (63) Continuation of application No. PCT/CN2020/076030, filed on Feb. 20, 2020.

(30) Foreign Application Priority Data

Feb. 22, 2019 (CN) .......................... 201910135700.4

(51) Int. Cl.
*H04W 40/24* (2009.01)
*H04W 40/38* (2009.01)
*H04W 68/00* (2009.01)

(52) U.S. Cl.
CPC ......... *H04W 40/248* (2013.01); *H04W 40/38* (2013.01); *H04W 68/005* (2013.01)

(58) Field of Classification Search
CPC . H04W 40/248; H04W 40/38; H04W 68/005; H04W 40/20; H04W 48/18;
(Continued)

(56) References Cited

U.S. PATENT DOCUMENTS 8,948,125 B2 * 2/2015 Hallenstal ......... H04W 36/0022
370/401
2002/0191556 A1 * 12/2002 Krishnarajah ........ H04W 28/06
370/352
(Continued)

FOREIGN PATENT DOCUMENTS

CN 101674628 A 3/2010
CN 102076054 A 5/2011
(Continued)

OTHER PUBLICATIONS

"3rd Generation Partnership Project; Technical Specification Group Services and System Aspects; Procedures for the 5G System; Stage 2 (Release 15)," 3GPP TS 23.502 V15.4.1, XP051591605, total 348 pages, 3rd Generation Partnership Project, Valbonne, France (Jan. 2019).
(Continued)

*Primary Examiner* — Ayaz R Sheikh
*Assistant Examiner* — Tarell A Hampton
(74) *Attorney, Agent, or Firm* — Leydig, Voit & Mayer, Ltd.

(57) ABSTRACT

A data transmission method, an apparatus, and a computer storage medium are provided. A first routing node receives downlink data of a terminal device. The first routing node sends a downlink paging request to a core network device, where the downlink paging request is used to indicate the core network device to search for a second access network device corresponding to a current location of the terminal device. The first routing node receives second routing information from a routing management node, where the second routing information is determined by the routing management node based on a routing information update request from the second access network device. The first routing node sends the downlink data to the terminal device via the
(Continued)

second access network device based on the second routing information.

9 Claims, 6 Drawing Sheets

(58) Field of Classification Search
CPC ..... H04W 36/12; H04W 68/00; H04W 68/02; H04W 40/02; H04L 45/54
See application file for complete search history.

(56) References Cited

U.S. PATENT DOCUMENTS

| | | | |
|---|---|---|---|
| 2007/0041346 A1* | 2/2007 | Bae | H04W 36/0033 370/331 |
| 2007/0117575 A1* | 5/2007 | Courau | H04W 68/00 455/458 |
| 2008/0192697 A1* | 8/2008 | Shaheen | H04W 36/0011 370/331 |
| 2009/0258631 A1* | 10/2009 | Forsberg | H04L 63/08 455/411 |
| 2010/0142488 A1* | 6/2010 | Zhang | H04W 36/0022 370/332 |
| 2010/0272063 A1* | 10/2010 | Kato | H04W 8/082 370/331 |
| 2010/0278108 A1* | 11/2010 | Cho | H04L 12/4633 370/328 |
| 2010/0303041 A1* | 12/2010 | Diachina | H04W 36/14 370/331 |
| 2011/0070886 A1* | 3/2011 | Masuda | H04L 63/101 455/435.1 |
| 2013/0039287 A1* | 2/2013 | Rayavarapu | H04W 76/28 370/329 |
| 2015/0223284 A1* | 8/2015 | Jain | H04W 36/0061 370/329 |
| 2016/0309379 A1* | 10/2016 | Pelletier | H04W 24/08 |
| 2017/0223148 A1* | 8/2017 | Roeland | H04W 36/0027 |
| 2018/0199398 A1* | 7/2018 | Dao | H04L 41/342 |
| 2018/0270715 A1* | 9/2018 | Lee | H04W 36/0011 |
| 2018/0270888 A1* | 9/2018 | Faccin | H04W 76/15 |
| 2018/0270894 A1 | 9/2018 | Park et al. | |
| 2019/0007992 A1* | 1/2019 | Kim | H04W 76/27 |
| 2019/0045408 A1 | 2/2019 | Kim et al. | |
| 2019/0053010 A1* | 2/2019 | Edge | H04W 4/029 |
| 2019/0059067 A1* | 2/2019 | Lee | H04L 67/141 |
| 2019/0075606 A1* | 3/2019 | Myhre | H04L 45/64 |
| 2019/0082316 A1* | 3/2019 | Peng | H04W 8/08 |
| 2019/0098537 A1* | 3/2019 | Qiao | H04W 36/0033 |
| 2019/0215724 A1* | 7/2019 | Talebi Fard | H04W 48/16 |
| 2020/0053828 A1* | 2/2020 | Bharatia | H04W 76/11 |
| 2020/0084675 A1* | 3/2020 | Lu | H04W 80/10 |
| 2020/0146077 A1* | 5/2020 | Li | H04W 76/10 |
| 2020/0267784 A1* | 8/2020 | Bharatia | H04L 65/80 |
| 2021/0204240 A1* | 7/2021 | Ma | H04W 68/005 |
| 2021/0219371 A1* | 7/2021 | Youn | H04W 48/18 |
| 2021/0345193 A1* | 11/2021 | Miklós | H04W 36/0069 |

FOREIGN PATENT DOCUMENTS

| | | |
|---|---|---|
| CN | 102143539 A | 8/2011 |
| CN | 102740268 A | 10/2012 |
| CN | 103108300 A | 5/2013 |
| CN | 106686622 A | 5/2017 |
| CN | 108307499 A | 7/2018 |
| CN | 108377522 A | 8/2018 |
| CN | 108738086 A | 11/2018 |
| CN | 108881356 A | 11/2018 |
| NO | 2018175034 A1 | 9/2018 |
| WO | 2017078485 A1 | 5/2017 |
| WO | 2017121481 A1 | 7/2017 |
| WO | 2017193797 A1 | 11/2017 |
| WO | 2018008629 A1 | 1/2018 |
| WO | 2018145654 A1 | 8/2018 |
| WO | 2018148891 A1 | 8/2018 |
| WO | 2018232759 A1 | 12/2018 |
| WO | 2018233499 A1 | 12/2018 |
| WO | 2018236830 A1 | 12/2018 |
| WO | 2019033281 A1 | 2/2019 |

OTHER PUBLICATIONS

Ericsson, "Data Types for parameters within UE Parameter Update via Control Plane Solution," 3GPP TSG-SA WG2 Meeting #130, Kochi, India, S2-1901137, total 13 pages (Jan. 21-25, 2019).

Yangping et al., "Analysis on Data Service Interruption Caused by Inter-RA Update Failures," Proceedings of the 2014 Annual Conference of Sichuan Communication Society, total 6 pages (Dec. 30, 2014). With English abstract.

Nokia, Ericsson, "Handover and Cell Reselection between GERAN Iu mode, GERAN A/GB mode and UTRAN," 3GPP TSG GERAN Adhoc #5, Seattle,USA, GAHW-010184, Total 19 pages, 3rd Generation Partnership Project, Valbonne, France (May 7-11, 2001).

ZTE, "Mobile Terminating Roaming Forwarding for Pre-paging," 3GPP TSG CT4 Meeting #52, Salt Lake City, US, C4-110762, Total 4 pages, 3rd Generation Partnership Project, Valbonne, France (Feb. 21-25, 2011).

\* cited by examiner

DATA TRANSMISSION METHOD, APPARATUS, AND COMPUTER STORAGE MEDIUM

CROSS-REFERENCE TO RELATED APPLICATIONS

This application is a continuation of International Application No. PCT/CN2020/076030, filed on Feb. 20, 2020, which claims priority to Chinese Patent Application No. 201910135700.4, filed on Feb. 22, 2019. The disclosures of the aforementioned applications are hereby incorporated by reference in their entireties.

TECHNICAL FIELD

Embodiments of this application relate to the field of communication technologies, and in particular, to a data transmission method, an apparatus, and a computer storage medium.

BACKGROUND

In an existing data transmission architecture, data of a terminal device is transferred through a general packet radio service tunneling protocol (GTP) channel between an access network device and a fixed user plane function (UPF) node. To be specific, after the terminal device accesses a network, a session management function (SMF) node selects a fixed UPF node for the terminal device, and establishes a fixed GTP channel: terminal device-first access network device-UPF-data network (DN), where the SMF is a user plane function node. For data transmission based on the GTP channel, the GTP channel needs to be established first. When the terminal device moves to a coverage area of a second access network device, the SMF node removes a GTP channel of the terminal device between the first access network device and the UPF node, and establishes a GTP channel of the terminal device between the UPF and the second access network device. In the existing data transmission architecture, a location update procedure of the terminal device is as follows: The terminal device notifies an access and mobility management function (AMF) node, where the AMF is a control plane function node. The AMF node notifies the SMF node when there is a data service requirement. Then, the SMF node establishes a GTP channel, second access network device-UPF-DN, for the terminal device. Therefore, in the location update procedure, the terminal device needs to first notify the AMF, and then the AMF notifies the SMF. As a result, signaling overheads are relatively large, and a data transmission delay is relatively high.

SUMMARY

Embodiments of the present invention provide a data transmission method, an apparatus, and a computer storage medium. An access network device may directly notify a user plane function node of location information of a terminal device, and does not need to forward the location information of the terminal device via a control plane function node, thereby reducing signaling overheads and a data transmission delay.

According to a first aspect, an embodiment of this application provides a data transmission method, including: A first routing node receives downlink data of a terminal device, where the downlink data is determined and sent based on first routing information of the terminal device in a routing management node. Then, the first routing node sends a downlink paging request to a core network device, where the downlink paging request is used to indicate the core network device to search for a second access network device corresponding to a current location of the terminal device. After the second access network device sends a routing information update request to the routing management node, the routing management node may determine second routing information based on the routing information update request, and send the second routing information to the first routing node, where the second routing information may include identifier information of a second routing node, identifier information of the second access network device, and identifier information of the terminal device. Based on this, the first routing node may send, based on the second routing information, the downlink data to the terminal device via the second access network device.

In this technical solution, the downlink data arrives at a lowest-layer routing node of the terminal device, and the lowest-layer routing node triggers downlink paging. After the second access network device pages the terminal device, data forwarding is supported. The second access network device may directly notify a user plane function node of location information of the terminal device, thereby reducing signaling overheads and a data transmission delay.

In a possible implementation, a manner in which the first routing node sends, based on the second routing information, the downlink data to the terminal device via the second access network device may be: sending the downlink data to the terminal device based on the second routing information via the second routing node and the second access network device sequentially.

According to a second aspect, an embodiment of this application provides a data transmission method, including: A first access network device receives downlink data of a terminal device, where the downlink data is determined and sent based on first routing information of the terminal device in a routing management node. Then, the first access network device sends a downlink paging request to a third access network device, and the third access network device sends a context obtain request message to the first access network device. Based on this, the first access network device sends the downlink data to the terminal device via the third access network device.

In this technical solution, the downlink data arrives at a lowest-layer routing node of the terminal device, and the lowest-layer routing node triggers downlink paging. After a second access network device pages the terminal device, data forwarding is supported. The second access network device may directly notify a user plane function node of location information of the terminal device, thereby reducing signaling overheads and a data transmission delay.

In a possible implementation, before sending the downlink data to the terminal device via the third access network device, the first access network device may send a routing information update request to the routing management node.

In a possible implementation, the first access network device may further verify the terminal device. When the verification succeeds, the first access network device determines a current location of the terminal device as a location corresponding to the third access network device.

According to a third aspect, an embodiment of this application provides a data transmission method, including: A second access network device receives location update notification information sent by a terminal device, and the second access network device sends a routing information update request to a routing management node. The routing management node determines second routing information based on the routing information update request, and sends the second routing information to the second access network device, where the second routing information may include identifier information of the second access network device and identifier information of the terminal device.

In this technical solution, a lowest-layer routing node of the terminal device may directly notify a user plane function node of location information of the terminal device, so that the lowest-layer routing node is prevented from notifying the user plane function node of the location information of the terminal device via a control plane function node, thereby reducing signaling overheads and a data transmission delay.

In a possible implementation, after receiving the second routing information from the routing management node, the second access network device may receive uplink data from the terminal device, and the second network device sends the uplink data to the routing management node based on the second routing information.

In a possible implementation, the second routing information may further include identifier information of the second routing node.

In a possible implementation, after receiving the second routing information from the routing management node, the second access network device may receive uplink data from the terminal device, and the second access network device sends, based on the second routing information, the uplink data to the routing management node via the second routing node.

In a possible implementation, a manner in which the second access network device sends the routing information update request to the routing management node may be: The second access network device sends a context obtain request message to a first access network device, where the routing information update request is sent by the first access network device to the routing management node.

According to a fourth aspect, an embodiment of this application provides a communication apparatus. The apparatus includes units configured to implement the data transmission method in the first aspect to the third aspect.

According to a fifth aspect, an embodiment of this application provides a computer storage medium. The computer storage medium stores a computer program or instructions. When the program or the instructions are executed by a processor, the processor is enabled to perform the data transmission method in the first aspect to the third aspect.

According to a sixth aspect, an embodiment of this application provides a communication apparatus, including a processor, where the processor is coupled to a memory.

The memory is configured to store instructions.

The processor is configured to execute the instructions in the memory, to enable the communication apparatus to perform the method in the first aspect to the third aspect.

According to a seventh aspect, an embodiment of this application provides a chip system, where the chip system includes a processor and an interface circuit, the interface circuit is coupled to the processor.

The processor is configured to execute a computer program or instructions, to implement the method in the first aspect to the third aspect.

The interface circuit is configured to communicate with another module outside the chip system.

DESCRIPTION OF EMBODIMENTS

Embodiments of this application may be applied to a wireless communication system. The wireless communication system may be a new radio (NR) system in a 5th generation (5G) mobile communication system, or may be a future new wireless communication system. This is not limited in this application.

In the embodiments of this application, an access network device, a terminal device, a routing node, a routing management node, and a core network device are specifically involved. The access network device is an access device used by the terminal device to access the wireless communication system in a wireless manner, and may be a NodeB, an evolved NodeB (eNodeB), a transmission reception point (TRP), a next generation NodeB (gNB) in the 5G mobile communication system, a base station in a future mobile communication system, an access node in a Wi-Fi system, or the like. A specific technology and a specific device form used for the access network device are not limited in the embodiments of this application.

The terminal device may also be referred to as a terminal, user equipment (UE), a mobile station (MS), a mobile terminal (MT), or the like. The terminal device may be a mobile phone, a tablet (Pad), a computer having a wireless transceiver function, a virtual reality (VR) terminal device, an augmented reality (AR) terminal device, a wireless terminal in industrial control, a wireless terminal in self driving, a wireless terminal in remote surgery (remote medical surgery), a wireless terminal in a smart grid, a wireless terminal in transportation safety, a wireless terminal in a smart city, a wireless terminal in a smart home, or the like. A specific technology and a specific device form used for the terminal device are not limited in the embodiments of this application.

The routing node may be a user plane function (UPF) node or another node including an area corresponding to at least one routing. The UPF node is responsible for related functions of a user plane, including functions such as data flow identification and deep packet parsing, quality of service (QoS) processing and bearer binding, and buffering of a downlink paging request.

The routing management node (RMN) is merely a function description, and may be a logical node or an entity node. For example, the RMN may be carried on an access network device or a user plane function node (for example, a UPF) including at least one access network device.

The core network device may be an access and mobility management function (AMF) node.

Data transmitted between the terminal device and the access network device may include uplink data and downlink data. The uplink data is data sent by the terminal device to the access network device, and the downlink data is data sent by the access network device to the terminal device.

Figure 1:
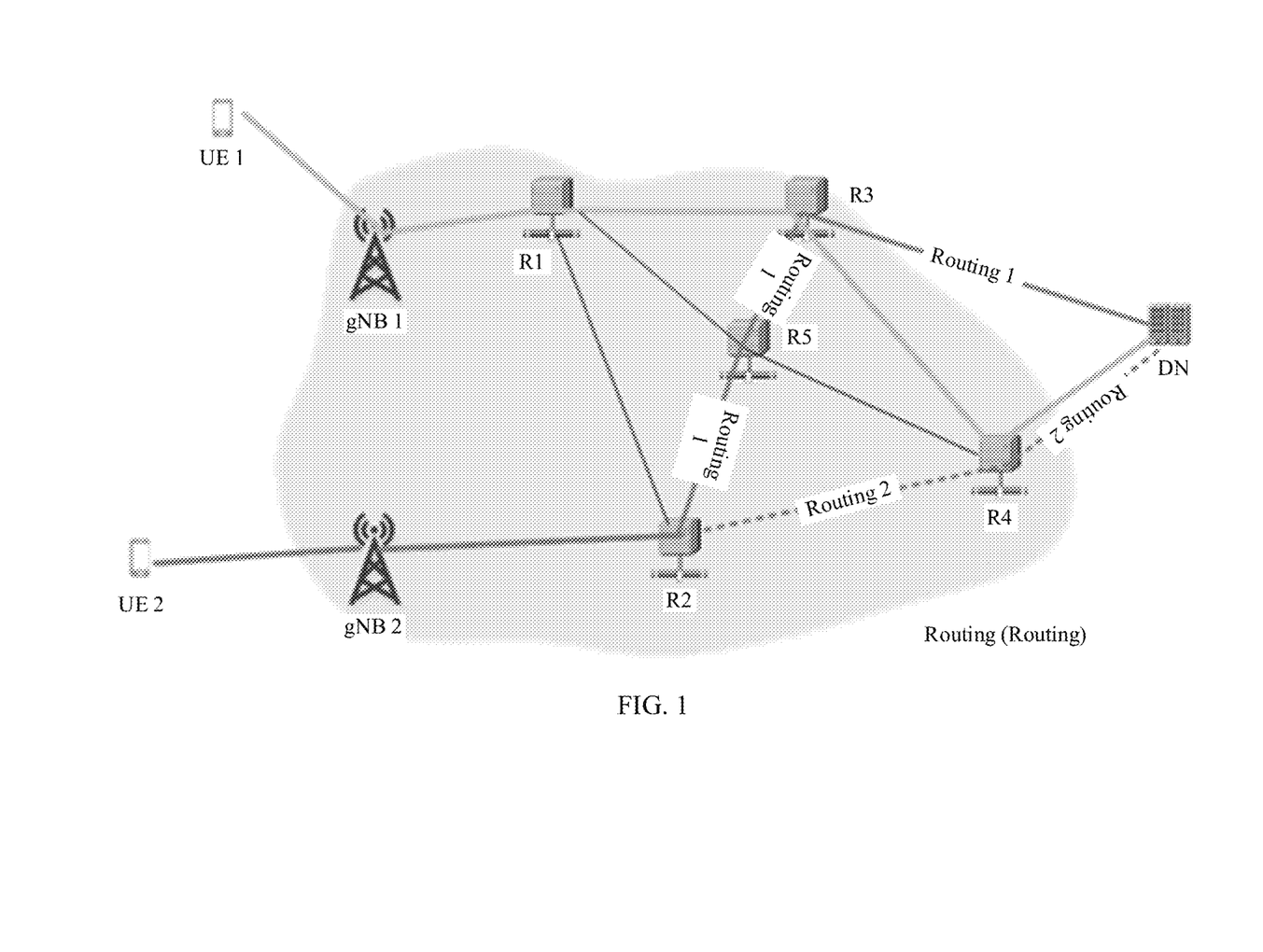
FIG. 1 is a schematic structural diagram of a data transmission system according to an embodiment of this application.

To better understand a data transmission method, an apparatus, and a computer storage medium that are disclosed in the embodiments of this application, the following first describes a data transmission system in the embodiments of this application. FIG. 1 is a schematic structural diagram of a data transmission system according to an embodiment of this application. The data transmission system may include terminal devices, access network devices, routing nodes, and a DN. For example, the terminal devices may include UE 1 and UE 2, the access network devices may include a gNB 1 and a gNB 2, and the routing nodes may include R1, R2, R3, R4, and R5. Compared with a conventional data transmission method, in this embodiment of this application, a GTP channel that is based on a terminal device and that is between an access network device and a routing node is not established, but a routing-based forwarding mechanism is used. As shown in FIG. 1, a data forwarding channel routed to the DN is not fixed or based on the terminal device. Instead, a better routing path is flexibly selected based on an amount of data through each channel. For example, the UE 1 may send uplink data to the DN via the gNB 1, the R1, the R3, and the R4 sequentially. For another example, the UE 2 may send uplink data to the DN via the gNB 2, the R2, the R5, and the R3 sequentially. For another example, the UE 2 may send uplink data to the DN via the gNB 2, the R2, and the R4 sequentially.

A status of the terminal device may include an idle state, an inactive state, and an active state. The terminal device entering the idle state does not retain air interface configuration information. The air interface configuration information is, for example, an access stratum context of the terminal device. The inactive state is a state between the idle state and the active state. The terminal device in inactive state may retain the access stratum context of the terminal device, and an access network device that configures the terminal device to enter the inactive state also retains the access stratum context of the terminal device.

The terminal device in different states may be routed to different layers in a routing table. For example, for the terminal device entering the idle state, a lowest-layer routing node in the routing table may be a UPF or another node including an area corresponding to at least one routing, such as a first routing node or a second routing node in the embodiments of this application. For another example, for the terminal device entering the inactive or active state, a lowest-layer routing node in the routing table may be an access network device, such as a first access network device, a second access network device, or a third access network device in the embodiments of this application.

In the embodiments of this application, a routing-based forwarding mechanism is used, and data may be directly forwarded based on a routing table. Compared with a relatively slow conventional location update procedure in which the terminal device needs to first notify a control plane node AMF, and then the AMF notifies a user plane node SMF, in the embodiments of this application, location information of the terminal device may be directly notified to the user plane function node, thereby reducing signaling overheads and a data transmission delay.

It may be understood that in the embodiments of this application, the terminal device and/or a network device may perform some or all steps in the embodiments of this application. These steps or operations are merely examples. In the embodiments of this application, other operations or variations of various operations may be further performed.

In addition, the steps may be performed in a sequence different from a sequence presented in the embodiments of this application, and not all the operations in the embodiments of this application may be performed.

Figure 2:
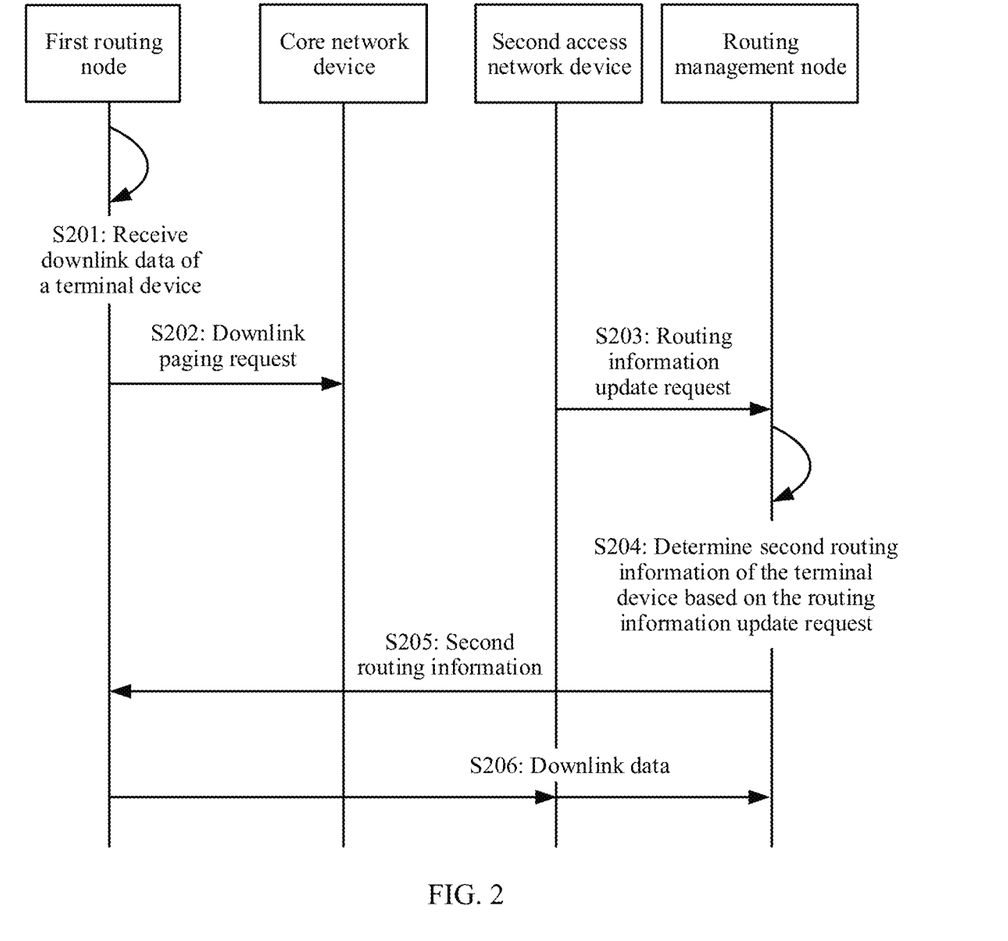
FIG. 2 is a schematic flowchart of a data transmission method according to an embodiment of this application.

With reference to the data transmission system shown in FIG. 1, FIG. 2 is a schematic flowchart of a data transmission method according to an embodiment of this application. Optionally, a terminal device in this embodiment is in idle state. The method includes but is not limited to the following steps.

Step S201: A first routing node receives downlink data of the terminal device, where the downlink data is determined and sent based on first routing information of the terminal device in a routing management node.

The routing management node is a network device having a function of maintaining a routing table of the terminal device. The routing table of the terminal device includes routing information of the terminal device. Optionally, the routing management node may determine a data transmission path based on the routing information of the terminal. The network device of the routing management node is not limited in this embodiment of this application. For example, the routing management node may be an access network device having the function, or the routing management node may be a core network device (for example, a UPF) having the function.

For example, the terminal device is currently located in a coverage area of a first access network device, and a routing node corresponding to the first access network device is the first routing node. In this case, the first routing information of the terminal device may be {identifier information of the first routing node<->identifier information of the first access network device<->identifier information of the terminal device}. When the downlink data of the terminal device arrives, the routing management node may determine, based on a mapping relationship between the terminal device and the first routing node, to forward the downlink data to the first routing node.

The downlink data of the terminal device received by the first routing node may be from the routing management node. Alternatively, another routing node or a data network may query the routing management node for the first routing information of the terminal device, and then send the downlink data to the first routing node based on the first routing information.

Step S202: The first routing node sends a downlink paging request to a core network device.

The downlink paging request is used to search for a second access network device corresponding to a current location of the terminal device.

Alternatively, step S202a: The first routing node sends a downlink paging request to the routing management node. To be specific, after receiving the downlink data of the terminal device, the first routing node may send the downlink paging request to the routing management node, and then the second access network device sends a routing information update request to the routing management node.

Step S203: The second access network device sends the routing information update request to the routing management node.

For example, if the terminal device moves to an area covered by the second access network device, the terminal device sends a paging request response message to the second access network device. The second access network device establishes a connection to a second routing node. The second access network device may send the routing information update request to the routing management node.

Step S204: The routing management node determines second routing information of the terminal device based on the routing information update request, where the second routing information includes identifier information of the second routing node, identifier information of the second access network device, and the identifier information of the terminal device.

The routing management node may determine the second routing information based on the routing information update request, where the second routing information may be {identifier information of the second routing node<->identifier information of the second access network device<->identifier information of the terminal device}. The routing management node may update the first routing information of the terminal device to the second routing information.

Step S205: The routing management node sends the second routing information to the first routing node.

Step S206: The first routing node sends, based on the second routing information, the downlink data to the terminal device via the second access network device.

In a specific implementation, if the first routing node may directly establish a connection to the second access network device, the first routing node may send the downlink data to the second access network device, and the second access network device sends the downlink data to the terminal device.

In a possible implementation, the first routing node may send, based on the second routing information, the downlink data to the terminal device via the second routing node and the second access network device sequentially. For example, the first routing node may send the downlink data to the second routing node based on the second routing information, the second routing node sends the downlink data to the second access network device, and the second access network device sends the downlink data to the terminal device.

This embodiment of this application may be applied to a core network architecture that includes a control plane core network (for example, an AMF) and a user plane core network (for example, a UPF), may be applied to a core network architecture that includes only a user plane core network, or may be applied to a network architecture in which the first routing node includes only an access network device. No specific limitation is imposed on this embodiment of this application.

In this embodiment of this application, the downlink data arrives at a lowest-layer routing node of the terminal device, and the lowest-layer routing node triggers downlink paging. After the second access network device pages the terminal device, data forwarding is supported. The second access network device may directly notify the user plane function node of location information of the terminal device, thereby reducing signaling overheads and a data transmission delay.

Figure 3:
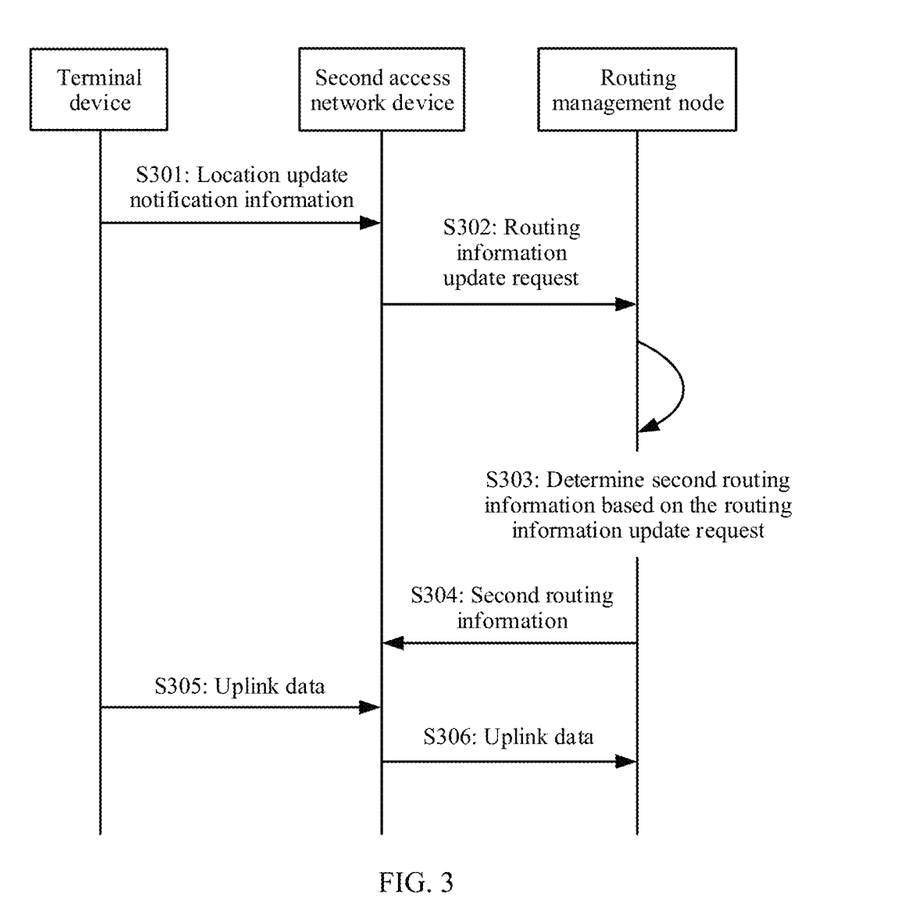
FIG. 3 is a schematic flowchart of another data transmission method according to an embodiment of this application.

With reference to the data transmission system shown in FIG. 1, FIG. 3 is a schematic flowchart of another data transmission method according to an embodiment of this application. Optionally, a terminal device in this embodiment is in idle state. The method includes but is not limited to the following steps.

Step S301: The terminal device sends location update notification information to a second access network device.

In a specific implementation, a core network device or a radio access network (RAN) may configure a valid mobility area for the terminal device. If the terminal device moves out of the valid mobility area, the terminal device needs to actively send the location update notification information to the second access network device. Alternatively, if the terminal device does not move out of the valid mobility area, when a periodic location update timer expires, the terminal device needs to actively send the location update notification information to the second access network device.

The valid mobility area may include a tracking area list (TA list), a radio access network notification area (RAN Notification Area, RNA), or another mobility area.

Step S302: The second access network device sends a routing information update request to a routing management node.

After receiving the location update notification information from the terminal device, the second access network device may determine that the terminal device moves out of the valid mobility area, or may determine that the terminal device moves to an area covered by the second access network device, and then the second access network device may send the routing information update request to the routing management node.

Step S303: The routing management node determines second routing information based on the routing information update request, where the second routing information includes identifier information of the second access network device and identifier information of the terminal device.

The routing management node may determine the second routing information based on the routing information update request, where the second routing information may be {identifier information of the second access network device<->identifier information of the terminal device}.

In an implementation, the second routing information may further include identifier information of a second routing node. For example, the second routing information may be {identifier information of the second routing node<->identifier information of the second access network device<->identifier information of the terminal device}.

Step S304: The routing management node sends the second routing information to the second access network device.

Optionally, in step S305, the terminal device sends uplink data to the second access network device.

Optionally, in step S306, the second access network device sends the uplink data to the routing management node based on the second routing information.

In an implementation, the second access network device may send the uplink data to the routing management node via the second routing node. For example, if the second routing information includes the identifier information of the second access network device, the identifier information of the second routing node, and the identifier information of the terminal device, after receiving the uplink data from the terminal device, the second access network device may send the uplink data to the second routing node based on the second routing information, and the second routing node sends the uplink data to the routing management node.

In this embodiment of this application, a lowest-layer routing node of the terminal device may directly notify a user plane function node of location information of the terminal device, so that the lowest-layer routing node is prevented from notifying the user plane function node of the location information of the terminal device via a control plane function node, thereby reducing signaling overheads and a data transmission delay.

Figure 4:
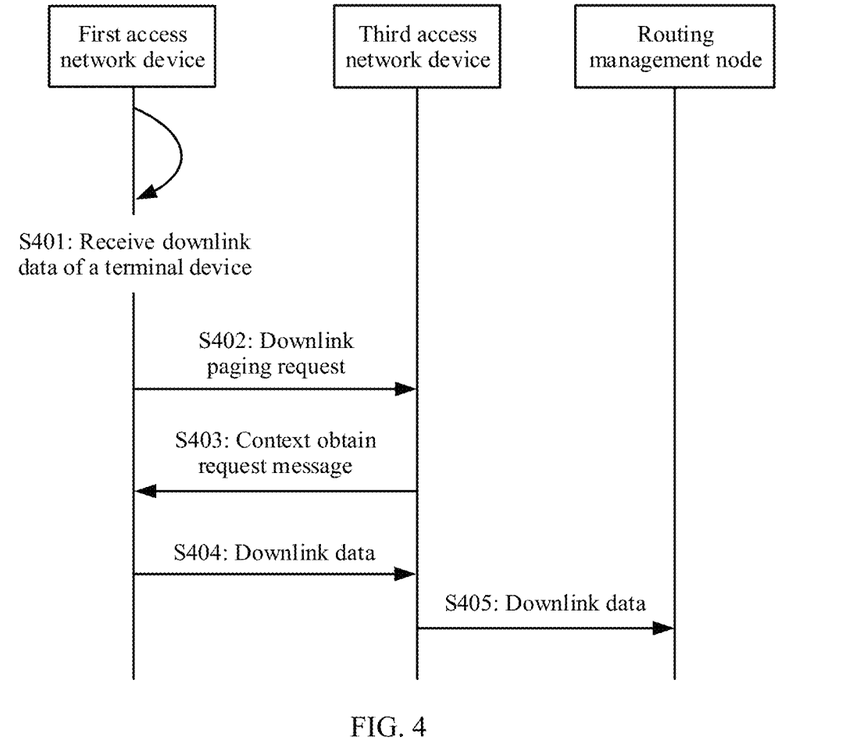
FIG. 4 is a schematic flowchart of another data transmission method according to an embodiment of this application.

With reference to the data transmission system shown in FIG. 1, FIG. 4 is a schematic flowchart of another data transmission method according to an embodiment of this application. Optionally, a terminal device in this embodiment is in inactive state. The method includes but is not limited to the following steps.

Step S401: A first access network device receives downlink data of the terminal device, where the downlink data is determined and sent based on first routing information of the terminal device in a routing management node.

The routing management node is a network device having a function of maintaining a routing table of the terminal device. The routing table of the terminal device includes routing information of the terminal device. Optionally, the routing management node may determine a data transmission path based on the routing information of the terminal. The network device of the routing management node is not limited in this embodiment of this application. For example, the routing management node may be an access network device having the function, or the routing management node may be a core network device (for example, a UPF) having the function.

For example, the terminal device is currently located in a coverage area of a first access network device. In this case, the first routing information of the terminal device may be {identifier information of the first access network device<->identifier information of the terminal device}. When the downlink data of the terminal device arrives, the routing management node may determine, based on a mapping relationship between the terminal device and the first access network device, to forward the downlink data to the first access network device.

The downlink data of the terminal device received by the first access network device may be from the routing management node. Alternatively, another routing node or a data network may query the routing management node for the first routing information of the terminal device, and then send the downlink data to the first access network device based on the first routing information.

For example, when the terminal device is in an area covered by the first access network device, the first access network device may configure the terminal device to enter the inactive state, and the first access network device may also configure an RNA for the terminal device in inactive state. When the terminal device in inactive state moves to an area that is covered by a third access network device and that is in the RNA, the third access network device may send a context obtain request message to the first access network device, and the first access network device may forward a context of the terminal device to the third access network device, or may reject to forward a context of the terminal device. When the terminal device in inactive state moves out of the RNA, the terminal device in inactive state may send, to a new target access network device, a message used to indicate an RNA update.

Step S402: The first access network device sends a downlink paging request to the third access network device.

For example, after the first access network device receives the downlink data of the terminal device, the first access network device may send a paging message to another access network device in the RNA of the terminal device, for example, send the downlink paging request to the third access network device, to page the terminal device via the first access network device and another access network device in the RNA of the terminal device.

Alternatively, step S402a: The first access network device sends a downlink paging request to the routing management node. For example, after the first access network device receives the downlink data of the terminal device, the first access network device sends the downlink paging request to the routing management node, and then the third access network device sends the context obtain request message to the first access network device.

Step S403: The third access network device sends the context obtain request message to the first access network device.

If the terminal device moves to the area covered by the third access network device, after receiving the downlink paging request, the terminal device sends a paging request response message to the second access network device, and the third access network device may send the context obtain request message to the first access network device.

In an implementation, after the third access network device sends the context obtain request message to the first access network device, the first access network device verifies the terminal device. When the verification succeeds, the first access network device may determine a current location of the terminal device as a location corresponding to the third access network device. Then, the first access network device sends the downlink data to the third access network device.

Step S404: The first access network device sends the downlink data to the third access network device.

Step S405: The third access network device sends the downlink data to the terminal device.

In a possible implementation, after the first access network device receives the context obtain request message from the third access network device, the first access network device may send a routing information update request to the routing management node. The routing management node determines second routing information based on the routing information update request, where the second routing information may include identifier information of the third access network device and the identifier information of the terminal device.

In this embodiment, when receiving the context obtain request message from the third access network device, the first access network device may determine that the terminal device moves to the area covered by the third access network device, and then the first access network device requests the routing management node to update routing information, thereby reducing an update delay of the routing information.

In another possible implementation, the third access network device may send the routing information update request to the routing management node. For example, if the third access network device receives, from the first access network device, a context of the terminal device or the downlink data of the terminal device, the third access network device may send the routing information update request to the routing management node. The routing management node determines second routing information based on the routing information update request, where the second routing information may include the identifier information of the third access network device and the identifier information of the terminal device. In this embodiment, after obtaining a service, the third access network device requests the routing management node to update the routing information. This has higher robustness.

In this embodiment of this application, the downlink data arrives at a lowest-layer routing node of the terminal device, and the lowest-layer routing node triggers downlink paging. After the third access network device pages the terminal device, data forwarding is supported. The third access network device may directly notify the user plane function node of location information of the terminal device, thereby reducing signaling overheads and a data transmission delay.

Figure 5:
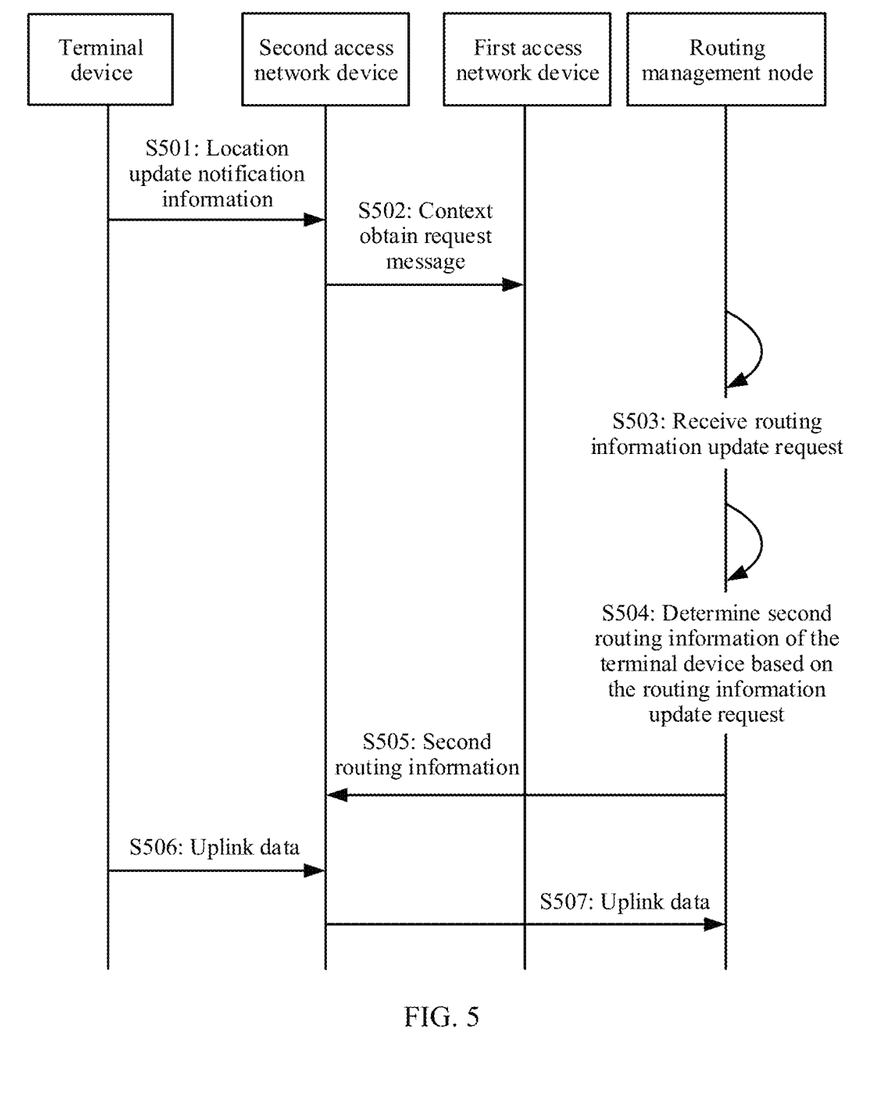
FIG. 5 is a schematic flowchart of another data transmission method according to an embodiment of this application.

With reference to the data transmission system shown in FIG. 1, FIG. 5 is a schematic flowchart of another data transmission method according to an embodiment of this application. Optionally, a terminal device in this embodiment is in inactive state. The method includes but is not limited to the following steps.

Step S501: The terminal device sends location update notification information to a second access network device.

For a mechanism for sending the location update notification information, refer to the descriptions in step S301. Details are not described herein again.

Step S502: The second access network device sends a context obtain request message to a first access network device.

Step S503: A routing management node receives a routing information update request.

In a possible implementation, after receiving the context obtain request message from the second access network device, the first access network device may send the routing information update request to the routing management node.

In another possible implementation, the second access network device may send the routing information update request to the routing management node. For example, after the second access network device sends the context obtain request message to the first access network device, if the second access network device receives a context of the terminal device from the first access network device, the second access network device may send the routing information update request to the routing management node.

Step S504: The routing management node determines second routing information of the terminal device based on the routing information update request, where the second routing information includes identifier information of the second access network device and identifier information of the terminal device.

The routing management node may determine the second routing information based on the routing information update request, where the second routing information may be {identifier information of the second access network device<->identifier information of the terminal device}.

Step S505: The routing management node sends the second routing information to the second access network device.

Optionally, in step S506, the terminal device sends uplink data to the second access network device.

Optionally, in step S507, the second access network device sends the uplink data to the routing management node based on the second routing information.

In this embodiment of this application, a lowest-layer routing node of the terminal device may directly notify a user plane function node of location information of the terminal device, so that the lowest-layer routing node is prevented from notifying the user plane function node of the location information of the terminal device via a control plane function node, thereby reducing signaling overheads and a data transmission delay.

The foregoing describes in detail the methods in the embodiments of this application. The following provides related apparatuses in the embodiments of this application.

Figure 6:
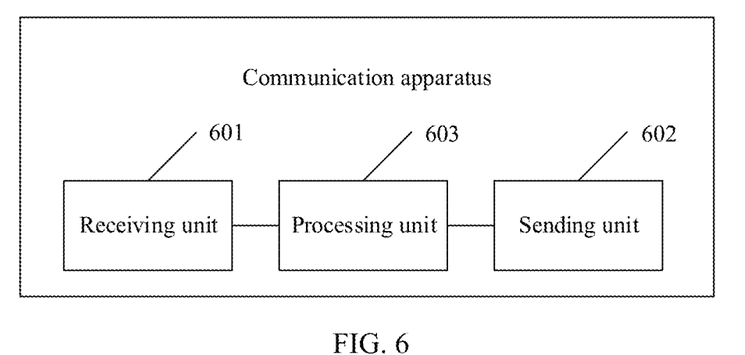
FIG. 6 is a schematic structural diagram of a communication apparatus according to an embodiment of this application.

FIG. 6 is a schematic structural diagram of a communication apparatus according to an embodiment of the present invention. The communication apparatus is configured to perform a step performed by the first routing node in the method embodiments corresponding to FIG. 2 to FIG. 5. The communication apparatus may include:

a receiving unit 601, configured to receive downlink data of a terminal device, where the downlink data is determined and sent based on first routing information of the terminal device in a routing management node; and a sending unit 602, configured to send a downlink paging request to a core network device, where the downlink paging request is used to indicate the core network device to search for a second access network device corresponding to a current location of the terminal device, where the receiving unit 601 is further configured to receive second routing information from the routing management node, where the second routing information includes a second routing node, the second access network device, and the terminal device, and the second routing information is determined by the routing management node based on a routing information update request from the second access network device; and the sending unit 602 is further configured to send, based on the second routing information, the downlink data to the terminal device via the second access network device.

In a possible implementation, that the sending unit 602 sends, based on the second routing information, the downlink data to the terminal device via the second access network device includes:

sending, based on the second routing information, the downlink data to the terminal device via the second routing node and the second access network device sequentially.

It should be noted that, for content that is not mentioned in the embodiment corresponding to FIG. 6 and a specific implementation of steps performed by the units, refer to the embodiments shown in FIG. 2 to FIG. 5 and the foregoing content. Details are not described herein again.

Figure 7:
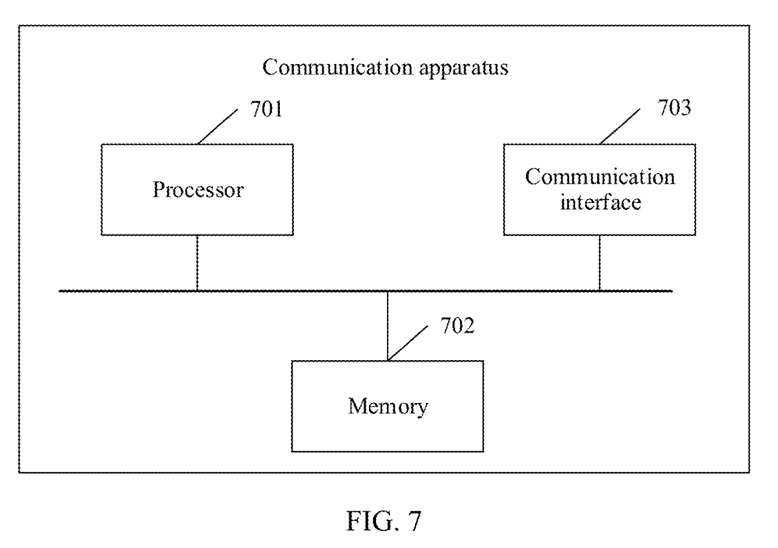
FIG. 7 is a schematic structural diagram of another communication apparatus according to an embodiment of this application.

In an implementation, related functions implemented by the units in FIG. 6 may be implemented in combination with a processor and a communication interface. FIG. 7 is a schematic structural diagram of another communication apparatus according to an embodiment of the present invention. The communication apparatus includes a processor 701, a memory 702, and a communication interface 703. The processor 701, the memory 702, and the communication interface 703 are connected by using one or more communication buses.

The processor 701 is configured to support the communication apparatus in performing the methods in FIG. 2 to FIG. 5. The processor 701 may be a central processing unit (CPU), a network processor (NP), a hardware chip, or any combination thereof.

The memory 702 is configured to store program code and the like. The memory 702 may include a volatile memory, for example, a random access memory (RAM). The memory 702 may alternatively include a non-volatile memory, for example, a read-only memory (ROM), a flash memory, a hard disk drive (HDD), or a solid-state drive (SSD). The memory 702 may alternatively include a combination of the foregoing types of memories.

The communication interface 703 is configured to receive and send data. For example, the communication interface 703 is configured to transmit downlink data.

In this embodiment of the present invention, the communication apparatus may include a plurality of communication interfaces, and a communication interface configured to send data and a communication interface configured to receive data may be different communication interfaces. For example, the communication interface configured to send data is a transmitter, and the communication interface configured to receive data is a receiver.

The processor 701 may invoke the program code stored in the memory 702 to perform the following operations:

receiving downlink data of a terminal device by using the communication interface 703, where the downlink data is determined and sent based on first routing information of the terminal device in a routing management node;

sending a downlink paging request to a core network device by using the communication interface 703, where the downlink paging request is used to indicate the core network device to search for a second access network device corresponding to a current location of the terminal device;

receiving second routing information from the routing management node by using the communication interface 703, where the second routing information includes a second routing node, the second access network device, and the terminal device, and the second routing information is determined by the routing management node based on a routing information update request from the second access network device; and sending, by using the communication interface 703 and based on the second routing information, the downlink data to the terminal device via the second access network device.

In an implementation, when the downlink data is sent to the terminal device via the second access network device by using the communication interface 703 and based on the second routing information, the processor 701 may specifically perform the following operation:

sending, based on the second routing information, the downlink data to the terminal device via the second routing node and the second access network device sequentially.

It should be noted that, for content that is not mentioned in the embodiment corresponding to FIG. 7 and a specific implementation of steps performed by the components, refer to the embodiments shown in FIG. 2 to FIG. 5 and the foregoing content. Details are not described herein again.

FIG. 6 is a schematic structural diagram of a communication apparatus according to an embodiment of the present invention. The communication apparatus is configured to perform a step performed by the first access network device in the method embodiments corresponding to FIG. 2 to FIG. 5. The communication apparatus may include:

a receiving unit 601, configured to receive downlink data of a terminal device, where the downlink data is determined and sent based on first routing information of the terminal device in a routing management node; and a sending unit 602, configured to send a downlink paging request to a third access network device, where the receiving unit 601 is further configured to receive a context obtain request message from the third access network device; and the sending unit 602 is further configured to send the downlink data to the terminal device via the third access network device.

In an implementation, before sending the downlink data to the terminal device via the third access network device, the sending unit 602 may further send a routing information update request to the routing management node.

In an implementation, the communication apparatus may further include a processing unit 603.

The processing unit 603 is configured to: verify the terminal device, and when the verification succeeds, determine a current location of the terminal device as a location corresponding to the third access network device.

It should be noted that, for content that is not mentioned in the embodiment corresponding to FIG. 6 and a specific implementation of steps performed by the units, refer to the embodiments shown in FIG. 2 to FIG. 5 and the foregoing content. Details are not described herein again.

In an implementation, related functions implemented by the units in FIG. 6 may be implemented in combination with a processor and a communication interface. FIG. 7 is a schematic structural diagram of another communication apparatus according to an embodiment of the present invention. The communication apparatus includes a processor 701, a memory 702, and a communication interface 703. The processor 701, the memory 702, and the communication interface 703 are connected by using one or more communication buses.

The processor 701 may invoke program code stored in the memory 702, to perform the following operations:

receiving downlink data of a terminal device by using the communication interface 703, where the downlink data is determined and sent based on first routing information of the terminal device in a routing management node;

sending a downlink paging request to a third access network device by using the communication interface 703;

receiving, by using the communication interface 703, a context obtain request message from the third access network device; and sending, by using the communication interface 703, the downlink data to the terminal device via the third access network device.

In an implementation, before the sending, by using the communication interface 703, the downlink data to the terminal device via the third access network device, the processor 701 may further send a routing information update request to the routing management node.

In an implementation, the processor 701 may further perform the following step:

verifying the terminal device, and when the verification succeeds, determining a current location of the terminal device as a location corresponding to the third access network device.

It should be noted that, for content that is not mentioned in the embodiment corresponding to FIG. 7 and a specific implementation of steps performed by the components, refer to the embodiments shown in FIG. 2 to FIG. 5 and the foregoing content. Details are not described herein again.

FIG. 6 is a schematic structural diagram of a communication apparatus according to an embodiment of the present invention. The communication apparatus is configured to perform a step performed by the second access network device in the method embodiments corresponding to FIG. 2 to FIG. 5. The communication apparatus may include:

a receiving unit 601, configured to receive location update notification information sent by a terminal device; and a sending unit 602, configured to send a routing information update request to a routing management node, where the receiving unit 601 is further configured to receive second routing information from the routing management node, where the second routing information includes the second access network device and the terminal device.

In an implementation, after receiving the second routing information from the routing management node, the receiving unit 601 may further receive uplink data from the terminal device; and the sending unit 602 is further configured to send the uplink data to the routing management node based on the second routing information.

In an implementation, the second routing information further includes a second routing node.

In an implementation, after receiving the second routing information from the routing management node, the receiving unit 601 may further receive uplink data from the terminal device; and the sending unit 602 is further configured to send, based on the second routing information, the uplink data to the routing management node via the second routing node.

In an implementation, that the sending unit 602 sends the routing information update request to the routing management node includes:

sending a context obtain request message to a first access network device, where the routing information update request is sent by the first access network device to the routing management node.

It should be noted that, for content that is not mentioned in the embodiment corresponding to FIG. 6 and a specific implementation of steps performed by the units, refer to the embodiments shown in FIG. 2 to FIG. 5 and the foregoing content. Details are not described herein again.

In an implementation, related functions implemented by the units in FIG. 6 may be implemented in combination with a processor and a communication interface. FIG. 7 is a schematic structural diagram of another communication apparatus according to an embodiment of the present invention. The communication apparatus includes a processor 701, a memory 702, and a communication interface 703. The processor 701, the memory 702, and the communication interface 703 are connected by using one or more communication buses.

The processor 701 may invoke program code stored in the memory 702, to perform the following operations:

receiving, by using the communication interface 703, location update notification information sent by a terminal device;

sending a routing information update request to a routing management node by using the communication interface 703; and receiving second routing information from the routing management node by using the communication interface 703, where the second routing information includes the second access network device and the terminal device.

In an implementation, after receiving the second routing information from the routing management node by using the communication interface 703, the processor 701 may further perform the following operations:

receiving uplink data from the terminal device; and sending the uplink data to the routing management node based on the second routing information.

In an implementation, the second routing information further includes a second routing node.

In an implementation, after receiving the second routing information from the routing management node by using the communication interface 703, the processor 701 may further perform the following operations:

receiving uplink data from the terminal device; and sending, based on the second routing information, the uplink data to the routing management node via the second routing node.

In an implementation, when sending the routing information update request to the routing management node by using the communication interface 703, the processor 701 may specifically perform the following operation:

sending a context obtain request message to a first access network device, where the routing information update request is sent by the first access network device to the routing management node.

It should be noted that, for content that is not mentioned in the embodiment corresponding to FIG. 7 and a specific implementation of steps performed by the components, refer to the embodiments shown in FIG. 2 to FIG. 5 and the foregoing content. Details are not described herein again.

All or some of the foregoing embodiments may be implemented by using software, hardware, firmware, or any combination thereof. When being implemented by using the software, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium, or may be transmitted by using a computer-readable storage medium. The computer-readable storage medium may be any usable medium accessible by a computer, or a data storage device, such as a server integrating one or more usable media. The usable medium may be a magnetic medium, for example, a floppy disk, a hard disk, or a magnetic tape; or may be an optical medium, for example, a DVD; or may be a semiconductor medium, for example, a solid-state drive (solid state disk, SSD).

In the embodiments of this application, unless otherwise specified or there is a logic conflict, terms and descriptions between different embodiments are consistent and may be mutually referenced, and technical features in different embodiments may be combined based on an internal logical relationship thereof, to form a new embodiment.

In this application, "a plurality of" means two or more than two. In the formula of this application, the character "/" indicates a "division" relationship between associated objects.

It may be understood that various numbers in the embodiments of this application are merely used for differentiation for ease of description, and are not used to limit the scope of the embodiments of this application. Sequence numbers of the foregoing processes do not mean execution sequences. The execution sequences of the processes should be determined based on functions and internal logic of the processes.

What is claimed is:

1. A data transmission method comprising:

receiving, by a first routing node, downlink data of a terminal device, wherein the downlink data is determined and sent based on first routing information of the terminal device in a routing management node;

sending, by the first routing node, a downlink paging request to a core network device, wherein the downlink paging request indicates the core network device to search for a second access network device corresponding to a current location of the terminal device;

receiving, by the first routing node, second routing information from the routing management node, wherein the second routing information comprises identifier information of a second routing node, identifier information of the second access network device, and identifier information of the terminal device, and the second routing information is determined by the routing management node based on a routing information update request from the second access network device; and sending, by the first routing node based on the second routing information, the downlink data to the terminal device via the second access network device.

2. The method according to claim 1, wherein the sending the downlink data to the terminal device via the second access network device comprises:

sending, by the first routing node based on the second routing information, the downlink data to the terminal device via the second routing node and the second access network device sequentially.

3. A data transmission method comprising:

receiving, by a first access network device, downlink data of a terminal device, wherein the downlink data is determined and sent based on first routing information of the terminal device in a routing management node;

sending, by the first access network device, a downlink paging request to a third access network device;

receiving, by the first access network device, a context obtain request message from the third access network device; and sending, by the first access network device, the downlink data to the terminal device via the third access network device.

4. The method according to claim 3, wherein before sending the downlink data to the terminal device via the third access network device, the method further comprises:

sending, by the first access network device, a routing information update request to the routing management node.

5. The method according to claim 3, further comprising:

verifying, by the first access network device, the terminal device; and in response to the verification being successful, determining, by the first access network device, a current location of the terminal device as a location corresponding to the third access network device.

6. A data transmission method comprising:

receiving, by a second access network device, location update notification information sent by a terminal device;

sending, by the second access network device, a routing information update request to a routing management node; and receiving, by the second access network device, second routing information from the routing management node, wherein the second routing information comprises identifier information of the second access network device and identifier information of the terminal device and wherein the second routing information further comprises identifier information of a routing node.

7. The method according to claim 6, wherein after receiving the second routing information from the routing management node, the method further comprises:

receiving, by the second access network device, uplink data from the terminal device; and sending, by the second access network device, the uplink data to the routing management node based on the second routing information.

8. The method according to claim 6, wherein after receiving the second routing information from the routing management node, the method further comprises:

receiving, by the second access network device, uplink data from the terminal device; and sending, by the second access network device based on the second routing information, the uplink data to the routing management node via the routing node.

9. The method according to claim 6, wherein the sending the routing information update request to the routing management node comprises:

sending, by the second access network device, a context obtain request message to a first access network device, wherein the routing information update request is sent by the first access network device to the routing management node.

* * * * *

UNITED STATES PATENT AND TRADEMARK OFFICE
CERTIFICATE OF CORRECTION

| | | |
|---|---|---|
| PATENT NO. | : 12,052,646 B2 | Page 1 of 1 |
| APPLICATION NO. | : 17/408192 | |
| DATED | : July 30, 2024 | |
| INVENTOR(S) | : Geng et al. | |

It is certified that error appears in the above-identified patent and that said Letters Patent is hereby corrected as shown below:

On the Title Page

Page 2: item (56), Right-Hand Column, Line 18: reads as "NO 2018175034 A1 9/2018" should read -- WO 2018175034 A1 9/2018 --.

Signed and Sealed this
Thirteenth Day of May, 2025

Coke Morgan Stewart
*Acting Director of the United States Patent and Trademark Office*